United States Patent [19]
Wustefeld

[11] 3,877,954
[45] Apr. 15, 1975

[54] POROUS MOULDINGS

[75] Inventor: Bernd Wüstefeld, Hamburg, Germany

[73] Assignee: Metastein Forschungsgesellschaft mbH

[22] Filed: May 2, 1972

[21] Appl. No.: 249,723

[30] Foreign Application Priority Data
- May 3, 1971 Germany............................ 2121574
- Mar. 28, 1972 Germany............................ 2215047
- Apr. 18, 1972 Germany............................ 2218662
- June 19, 1971 Germany............................ 2130540

[52] U.S. Cl. ................................ 106/75; 106/40 R
[51] Int. Cl. ............................................. C04b 21/00
[58] Field of Search ..... 106/40 R, 75, 74, 84, 40 V, 106/288 B; 252/62; 264/43

[56] References Cited
UNITED STATES PATENTS

| | | | |
|---|---|---|---|
| 3,261,894 | 7/1966 | Seidl | 106/40 R |
| 3,663,249 | 5/1972 | Rao | 106/75 |

Primary Examiner—J. Poer
Attorney, Agent, or Firm—Craig & Antonelli

[57] ABSTRACT

A method of manufacturing porous moulded bodies in which crushed crystaline silicate material is mixed with alkali silicates in the ratio of 2-6:1, the mixture containing 15 percent water by weight of dried substance. The mixture is heated in a closed vessel affording a constant volume system at 140°-500°C so as to avoid the vapour phase and produce a transformation product which is then dried, crushed and heated, if necessary with additives. There is also provided a device for heating the crushed transformation product, the device comprising a bell-type furnace with a hearth plate on which a stack of moulds is placed, an annealing bell having heating elements removably disposed over the hearth plate and a further cooling cap over the hearth plate.

23 Claims, 5 Drawing Figures

POROUS MOULDINGS

The invention relates to a method for the manufacture of porous molded bodies, in which silicate material is transformed with alkali silicates and water, the transformation product is dried, crushed and heated, if necessary with additives.

There are already many methods for the manufacture of foamed products from silicates and glass. However, the known methods require either a complicated pretreatment of the added materials, such as melting and dissolving processes, or the properties such as compressive strength and frost resistance leave much to be desired. It is also known to produce porous masses from alkali silicates with fillers such as quartz, magnesia, mica, asbestos, basalt, and other powdered minerals, the mixtures being concentrated and then heated so that as a result of the rapid evaporation of the water a swelling of the silicate is obtained. Gas generating substances such as for example silicon carbide are also added to mixtures of this type in order to increase the number of pores. However these methods have considerable disadvantages, because the molded bodies produced have inadequate compressive strength and are chemicaly unstable with regard to water, if they have a low proportion of filler, whereas with a high proportion of filler they do not have a uniform foam structure.

All these disadvantages are avoided in the method according to the invention which consists in that crushed crystalline silicate material is added to the akali silicates in the weight ratio of 2-6:1 and the mixture, containing approximately 15 percent water by weight of dry substance is heated to produce to transformation product in a closed vessel at 140°–500°C.

The molded bodies produced according to the invention have a greater compressive strength with the same weight per unit volume, as a result of their more uniform foam structure they have better insulating properties, they have good sound insulation properties and in the case of fire they behave better than normal foam glass. They can be worked in any manner, for example by cutting, screwing, nailing, drilling, sawing, milling and grinding. The bonding power with respect to mortar, lime, plaster, cement and concrete is very good.

In one embodiment of the method according to thee invention the transformation takes place with a constant volume avoiding the vapour phase. The changes of state which a certain mixture of substances can pass through during heating under its own vapour pressure, depend on the degree to which the vessel is filled, i.e., on the ratio of the volume of the vessel to the volume of the amount of substance used or, if the latter is fixed, on the volume of the system or on the volume of the vessel. The changes of state which a given weight of mixture of given composition, can pass through in different but constant volumes are varied.

Now it has been shown that there is an optimum change of state in the system, whereby there is produced a transformation product which after dehydration between 140° and 500°C, crushing to a powder, charging into molds and heating to temperatures between 700° and 900°C, can readily be foamed to form molded bodies with an optimum foam structure without the addition of foaming agents. The optimum change of state results form filling of the vessel with a substance to be transformed to a predetermined extent. This action is utilised in the examples of application given herafter. It is particularly notable in that during transformation the substance loses no water due to evaporation. After a transformation time lasting 2 hours the vessel is opened at the transformation temperature and at this temperature the fact that there is no water loss is determined by weighing.

Powdered silicate minerals such as basalt, porphyry and nepheline-syenite are preferably used as the starting material but other powdery, fibrous lamelliform rocks and minerals of silicate nature are well-suited. The alkali silicates may be supplemented by borates, phosphates and other glass forming substances, the amount of water necessary for the transformation advantageously being added by using hydrates of these salts. In a suitable starting material, the silicate material and alkali silicates are present in the weight ratio of 3.3:1 and the transformation takes place when the vessel contains 540 to 580 g/liter volume of the vessel and at a temperature of about 200°C.

At a transformation temperature of 200°C for a mixture of 100g basalt, 40g $Na_2SiO_3.5H_2O$ and 15g $H_3BO_3$ a substance amount of 570g per litre of volume of the vessel is an optimum degree of filling. The vapour pressure thus existing in the closed vessel at the end of the transformation process amounts to approximately one atmosphere i.e., there is no excess pressure in the vessel. If the vessel is not filled to this extent, water evaporates, as demonstrated by the weight loss on opening the vessel at the transformation temperature at the end of the transformation period, and a greater vapour pressure of the system is thus shown to occur. During the transformation there cannot be a uniform equilibrium of the system. Consequently the process described as the optimum change of state produces an unstable or meta-stable product which after additional dehydration and grinding to the fine state is characterised by increased energy content. After dehydration likewise at 200°C in an open vessel the initial product still contains approximately 2.5 percent water; above 700°C it begins to become viscous.

It has been shown that the foam structure of the dehydration products of the transformation products is produced with the optimum change of state by heating to the foaming temperature, this foam structure being only slightly affected by alteration of the foaming temperature by 30°C, e.g., between 720° and 780°C or by altering the residence time in the range 10 to 30 minutes. Within the said time and temperature ranges the bubble diameter of the foam body amounts to 1 to 2 millimetres. On heating beyond these time and temperature ranges a coarser structure can be obtained or even a wide variation of the size of the bubbles, which is appropriate for sound insulation. As a result of the slight effect on the foam structure due to the residence time molded bodies of greater thickness than customary foam glass can be produced, i.e., by extending the residence time foaming inside the body can be forced even with thick molded bodies. An addition of small amounts, for example up to 10 percent by weight, preferably 0.1 to 5 percent, of compounds with low surface tension such as $TiO_2$ and $V_2O_5$, to the initial mixture have proved advantageous, since the transformation temperature and foaming temperature are reduced due to the low surface tension. In addition the wall thickness of the bubble wall is reduced, and the foaming product becomes still lighter. The weight per unit volume of the molded body produced by the method according to the invention amounts to approximately 0.2g/cm$^3$, which is decreased to 0.15g/cm$^3$ by the addition of compounds which reduce the surface tension.

The number of bubbles per cm$^3$ of the molded body can be reduced without changing the size of the bubble and the compressive strength of the molded body is simultaneously increased considerably if rock-like materials such as for example, basalt dust are added up to 20 percent by weight to the dehydration product according to the method of the invention. The compressive strengths obtained in this manner are substantially greater and due to a further decrease in the number of bubbles can be increased into the range of the compressive strengths of bricks. The insulating property of bricks is however greatly exceeded. By the addition of ceramic dyes colouring effects can be obtained as in coloured glazes.

Example 1

One-hundred g melaphyre rock are ground to a grain size of 0.1 to 1mm and mixed with 40g sodium metasilicate hydrate Na$_2$SiO$_3$. 5H$_2$O and 15g boric acid H$_3$BO$_3$. 570g of the mixture are placed in a vessel of 1,000cm$^3$ capacity. The vessel is closed and heated with the contents to 200°C and kept at this temperature for two hours. At 200°C the transformation product contains all the water introduced by the hydrate and the boric acid, which is driven off to 2.5 percent by a subsequent dehydration process in an open vessel at 200°C. The product which is dried and crushed to a grain size of 0.1 to 1mm is placed in a metal mould lined with a dressing, heated for 30 minutes to 750°C and cooled slowly for 2 hours.

Example 2

According to the method described in example 1, 100 g basalt powder, 40g Na$_2$SiO$_3$.5H$_2$O, 15g H$_3$BO$_3$ and 10g tiO$_2$ are heated for 2 hours at 175°C with a degree of filling of 580g substance per litre of volume of vessel. After drying and crushing to a maximum grain size of 0.5mm the transformation product is heated to 800°C for 30 minutes followed by cooling to room temperature in an expansion oven over a period of 2 hours. A body having minute bubbles with a bubble diameter of 2mm is obtained.

Example 3

80g of the dried transformation product according to example 1 are mixed with 20g basalt dust and heated to 800°C in a metallic mould. A porous molded body with a maximum pore size of 2mm diameter of very high compressive strength is obtained.

One embodiment of the method according to the invention serves for the manufacture of porous molded bodies from lime mortar and consists in that lime mortar and if necessary blowing agents are added to the dried transformation product. Molded bodies thus produced differ from similarly produced molded bodies such as limesand lightweight bricks and molded bodies of gas concrete due to greater compressive strength. Moreover, the transformation products according to the invention accelerate the hardening process.

Methods already exist for improving the setting and hardening processes of mortar and for accelerating the reaction between the components of the bonding agent- the mortar. Thus building bricks (sand lime bricks) can be produced from lime mortar; for this, mixtures of quicklime and sand are slaked, placed on presses in brick moulds and then in a closed hydrogenator are subjected for eight to ten hours to the action of super-heated water vapour at eight atmospheres. Calcium hydrogen silicate is thus formed which cements the grains of sand. The strength of the hardening mortar body is greater, the thicker it is, i.e., the smaller its internal cavities. In order to preclude this as extensively as possible poly(hetero) dispersity is necessary.

Since in contrast in the case of limesand bricks inner cavities have to be increased in order to obtain better heat insulation, for limesand bricks a significantly better cementing of the sand grains is necessary by increased formation of calcium hydrogen silicate. Attempts have been made to do this by increasing the pressure and temperature of the hydrogenator, however, it can only be realised up to a degree which is unsatisfactory with respect to the compressive strength of limes and bricks.

Now it has been found that the addition of the transformation products produced according to the invention increases the bonding capacity of mortar mixtures and as a result thereof increases the compressive strength of molded bodies produced from such lime mortar mixtures. The hardening process of the lime mortar mixtures is itself considerably accelerated if the additions of the transformation product with respect to the lime proportion amount only to 2 to 5 percent. A further increase up to 10 percent of the lime proportions results in a still greater acceleration. It is particularly advantageous for the transformation product to be ground as fine as dust. The mortar mixtures with additions of transformation products of a silicate nature are improved mortar mixtures and can be used in all customary applications. Thus the setting and hardening times are substantially shortened.

It is also possible to use additional silicates which are ground as fine as dust which are obtained by decomposing material of a silicate nature with alkali silicates in an aqueous solution and by evaporating the solution to dryness.

Example 4

Mixtures of
300g sand
150g quicklime
10g of transformation product of silicate nature are slaked with water, placed on presses in brick molds and then in a closed hydrogenator subjected to 2 to 5 hours to the action of super-heated water vapour at eight atmospheres.

Example 5

Mixtures according to example 4 are slaked in water, poured into moulding carriages and after the addition of pore-forming aluminum powder is caused to blow. Subsequently the mass thickens and is cut to the desired shape by means of steel wire saws. The shapes divided up in this way are introduced into the hydrogenator and hardened in the latter with super-heated steam at 10 atmospheres and 180°C, due to which they obtain their final shape (constancy of volume) and strength. The customary residence time of 10 to 12 hours for this process can be shortened by more than 50 percent, and nevertheless considerable increases in compressive resistance are obtained.

Example 6

A mortar mixture of 
- 300g sand
- 140g lime
- 30g Portland cement
- 15g transformation product hardens forming calcium hydrogen silicate in air in 24 hours.

A further embodiment of the method according to the invention consists in that polybasic, weak to at the most moderately strong, oxygen-containing acids of non metals approximately in equimolar proportion to the alkali silicates and/or finely divided aluminum hydroxide (alumina gel) are added to the initial material, and the transformation takes place at a water vapour pressure which can be increased up to twelve atmospheres as a maximum, so that at an excess pressure of approximately one atmosphere the transformation product contains the sodium aluminium silicate gels which have occurred and with increasing pressure the crystals produced from the sodium aluminium silicate gels, such as analcime and zeolite.

Whereas in the above described embodiment of the method according to the invention the constancy of the moisture content during the transformation process is achieved due to the choice of an optimum degree of filling, according to the variation now described the formation of aqueous sodium aluminium silicates by the addition of an amount, which is equimolar with the alkali silicate, of polybasic, weak to at the most moderately strong, oxygen-containing acids of non metals is achieved. In this case depending on the extent of the water vapour excess pressure there occur precipitations of the sodium aluminium silicates in the form of a gel or crystals. In place of a polybasic, weak acid finely divided aluminium hydroxide (alumina gel) can also be used in part. On heating the mixture in the vessel fusions occur, which take place due to a very considerable reduction of the melting point, which can be traced back to the water and acid content. Thus for example, pure $K_2Si_2O_5$ melts at 1,015°C, whereas an addition of approximately eight per cent water reduces the melting point to approximately 500°C and a further addition of acid, for example of boric acid, facilitates the fusion in the range of the transformation temperatures used according to the method of the invention.

The fusion occurring in the method according to the invention is, in particular, capable of dissolving large amounts of plagioclase and, by reacting with the melt, of forming the molecule $Na_2O.Al_2O_3.5SiO_2$ which with a change in state e.g., an increase of the water vapour excess pressure separates out again as analcime ($Na_2O.Al_2O_3.4SiO_2.H_2O$). Primary crystalised magmatic analcime also occurs naturally, even if the real hydrothermal formation is more frequent.

In this variation of the method, by varying the conditions the possibility exists of producing glass-like porous molded bodies of very varied nature, namely a series of molded bodies with increasing weight per unit volume and increasing compressive strength depending on the water vapour excess pressure achieved in the transformation vessel, in which the transformation had been interrupted and which is critical for the content of zeolite in the transformation product. Precipitations of sodium aluminium silicates in the form of a gel or crystals occur according to the extent of the water vapour excess pressure. In the form of crystals they are zeolites, which can be formed hydrothermally i.e., from sodium aluminium silicate gels, or primarily by separating out of the fusion. In the form of a gel they are sodium aluminum silicates, which have been able to be formed both by precipitation of the gels and by vitreous solidification.

The fact that the nature of the transformation product depends substantially on the water vapour excess pressure is important for this variation of the method according to the invention, so that the nature of the finished product which depends on the properties of the transformation products, can be influenced by controlling the water vapour excess pressure.

In preferred embodiments of the method according to the invention apart from the aqueous alkali silicates other material of silicate nature is introduced. Powdered minerals rich in aegirine, natural or synthetic zeolites and/or other easily fusible silicates are preferably introduced as material of silicate nature. However, by material of silicate nature there should generally be understood all natural and synthetic silicates, such as rocks of silicate nature, quartzite, light ashes, blast furnace slag and ordinary building sand. If the material of silicate nature contains no aluminium, then in the variation of the method according to the invention just described aluminium hydroxide must be added to the mixture serving as the initial material, so that in each case during the transformation alkali aluminium silicates in the form of a gel or in the form of crystallised compounds occur. In this case the transformation products are appropriately ground to a dust, because they consist preponderantly of crystals and not, as in the first variation of the method according to the invention preponderantly of gels.

It is also possible to admix with the conversion product a silicate material. In this case, the ratio of the silicate material to the conversion product should be 0.02 to 6:1.

Example 7

Five-hundred g basic rock rich in plagioclase (basalt, bytownite, anorthosite) was finely ground and then mixed with 212g sodium metasilicate-5-hydrate and 82g boric acid ($H_3BO_3$). The mixture was then heated in a closed vessel having a capacity of 1.3 litres, which was equipped with a monometer and a pressure valve, to 200°C. The water vapour excess pressure in the vessel increased slowly. On reaching a predetermined water vapour excess pressure this stage of the method was interrupted. The transformation product obtained in this way was dried at 200°C, then finely ground and heated in a mould to 700° to 900°C. This method was repeated many times and the transformation process was thus interrupted at different pressures. In this way molded bodies of varying compressive strength and varied weight per unit volume were obtained, which are given in the following table:

| Water vapour excess pressure atmospheres | Compressive strength kg/cm² | Weight per unit volume g/cm³ |
| --- | --- | --- |
| 0–1 | 10–20 | 0.15–0.18 |
| 2 | 25.6 | 0.21 |
| 5 | 37 | 0.27 |
| 8.75 | 47.5 | 0.32 |
| 10.5 | 57 | 0.37 |
| 11.3 | 65.6 | 0.41 |

| Water vapour excess pressure atmospheres | Compressive strength kg/cm² | Weight per unit volume g/cm³ |
| --- | --- | --- |
| 11.6 | 73.3 | 0.45 |
| 12 | 80 | 0.50 |

Example 8

50g ground sand
20g sodium metasilicate-5-hydrate
7.5g boric acid
7.5g aluminium hydroxide. (alumina gel)
where mixed and then heated in a closed vessel for 2 hours at 200°C. The transformation product obtained in this manner was then dired at 200°C, ground and placed in a metal mould. On heating to approximately 950°C a foam body having minute bubbles was formed, which was cooled down in a glass expansion oven from 500°C to temperatures below 50°C in the course of 2 hours.

Example 9

Eighty-two g boric acid, 212g sodium metasilicate-5-hydrate and 80g aluminium hydroxide were mixed together and heated in a closed vessel to 200°C. In this way an alkali aluminium silicate containing boric acid having the composition $mMe_2O.Al_2O_3.nSiO_2.p-H_2O+qH_3BO_3$ is obtained. The conditions for the occurrence of this transformation product are the predetermined alkali medium adjusted by the addition of boric acid, the reaction temperature in the vessel and the water vapour excess pressure. The transformation product obtained is then dried at 200°C and finely ground. In this embodiment the gel form is preferred for the transformation product, which leads to finished products with low weight per unit volume. The gel powder obtained as the transformation product was further processed as set out in detail hereafter;

a. The gel powder was heated to 800°C in a metallic mould without any additions. On foaming there occurred glass-like, porous molded bodies with a very low weight per unit volume of approximately 0.2g/cm³.

b. The gel powder was mixed with basalt powder in a weight ratio of 1;1 and heated in a metallic mould to 900°C. In this way a foam body occurred, which had approximately the chemical composition of ordinary glass, mainly 72.2 percent glass formes ($SiO_2,B_2O_3,Al_2O_3$), 12.9 percent oxides of bivalent metals ($CaO,MgO,FeO$) and 14.3 percent $Na_2O$. The weight per unit volume of the foam body lay between 0.2 and 0.3g/cm³.

c. The gel powder was mixed with basalt powder in the weight ratio of 3;4. By heating to 900°C a molded body with a weight per unit volume of approximately 0.3g/cm³ is obtained.

d. By mixing the gel powder with basalt powder in the ratio 1;2 and subsequent heating of the mixture to 950°C a molded body having a weight per unit volume of 0.5g/cm³ is obtained.

Example 10

The method according to example 9 was repeated, however in place of the basalt a rock material rich in aegirine was used. The molded body produced from the mixtures of the gel powder and from the powder made from a rock material rich in aegirine had a weight per unit volume between 0.08 and 0.20g/cm³. Similar results are also obtained if in place of the rock material rich in aegirine another easily fusible material of silicate nature is introduced.

The invention also relates to a device for heating the transformation product obtained according to the method of the invention and crushed, in metallic moulds for a period of up to approximately thirty minutes at temperatures between 700° and 900°C and the subsequent cooling to room temperature for a period of approximately 2 hours.

In the method according to the invention the molded bodies are produced during the heat treatment in the metal molds of the transformation product obtained in the way described. The device according to the invention must facilitate the heat treatment of the transformation product for producing the molded bodies rationally on the scale of industrial manufacture. The use of continuous furnaces as is customary in industrial manufacture, has the disadvantage that with respect to the duration of the heat treatment the long cooling period, which can amount to ten times the duration of the heat treatment, requires extended cooling processes with respect to the heat treatment process, which makes a manufacture of this type irrational. However the cooling down should take place as closely as possible according to an optimum characteristic, so that no stresses are formed in the molded bodies to jeopardise their stability.

This object is fulfilled according to the invention in that the device comprises a bell-type furnace with a hearth plate, on which a pile of moulds is placed, and with a cooling cap provided with heating elements which is placed over the hearth plate and can be lifted off and that a further cooling cap is present which can be placed over the hearth plate and lifted off, the properties of which cooling cap are chosen with respect to the desired cooling characteristic.

Thus the invention makes use of a bell-type furnace, the construction of which is basically known from wire-annealing furnaces which however have not previously been used for the manufacture of glass-like porous molded bodies. A bell-type furnace of this type provides the possibility of arranging a plurality of the moulds under its annealing bell in the form of a stack, so that a large number of molded bodies can be produced in one operation. However it is of particular advantage that by means of a separate cooling cap the cooling characteristic can be varied within wide limits and adjusted to an optimum course. Thus the cooling cap can be formed for example from a metallic cap located during heating between the annealing bell and stack of molds. This metal cap is thus heated together with the molds, so that it protects the moulds with the molded bodies on raising the annealing bell against a rapid cooling due to the low ambient temperature. The heating capacity of the components located below the annealing bell and the heat transmission capacity of the metallic cap can be sychronised relative to each other, such that 2 hours are required for cooling the molds to room temperature. As already mentioned, a metallic cap located during heating between the annealing bell and stack of molds prevents a rapid cooling of the molded bodies which are at high temperatures on account of its high initial temperature.

In order to avoid stresses in the molded bodies it can however be important that the cooling in the lower temperature ranges does not take place too quickly, whilst the cooling in the upper temperatures can take place more rapidly, so as not to extend the entire cooling period too greatly. In this case it may be advantageous to use a cooling cap, which is put is position alternately with the annealing bell and consists of an insulating material, so that it can be referred to as an insulating cap. Thus, if it is placed over the stack of moulds after removing the annealing bell this insulating cap does not have the high temperature of the stack of molds, so that it has a considerable cooling effect on the stack of moulds. As a result the stack of molds with the molded bodies is firstly cooled relatively quickly, until there is a temperature equilibrium between the stack of molds and the insulating cap. Then, on account of the insulating properties of the insulating cap a considerably slower loss of heat takes place, so that the cooling within the range of temperatures which already lie close to the ambient temperature, takes place only very slowly. In order that placing in position of a cold insulating cap does not result in too rapid cooling of the molded body at the high temperatures, the insulating cap can be provided with heating elements for preheating it to a moderate temperature. It can be seen that due to the choice of the pre-heated temperature for the insulating cap and of the material from which the insulating cap is made, the cooling characteristic can be influenced within wide limits, in order to obtain optimum results, without complicated regulating devices being necessary for this or the cooling time being extended too greatly.

A further advantage of the device according to the invention consists in that it facilitates a very rational manufacture of molded bodies as regards the charge, if in a further embodiment of the invention several annealing positions are provided, which comprise respectively a hearth plate and a cooling cap and a common annealing bell which travels from one annealing position to another is associated with these annealing positions. The number of annealing positions depends on the ratio of the annealing time to the cooling time plus the preparation time in order that the annealing bell can be moved from one annealing position to another without any delay, whilst the free annealing positions cool down, are unloaded and refilled. Due to this embodiment of the invention the costs for the device according to the invention are reduced considerably, because a substantial part of the cost for a bell-type oven are taken up by the annealing bell and a particularly rational operation is also possible because the heated annealing bell does not need to be cooled and is in operation without any appreciable interruptions.

The stack of molds located on the hearth plate of the bell-type furnace can consist simply of a number of tin plates and metal frames located on the tin plates. The tin plates form the base of the molds otherwise limited by the metal frames placed in position and the tin plates of the upper molds are always placed on the frames of the molds located thereunder, so that a stack of molds of this type is very simple in construction and necessitates no expensive parts. In this case, the tin plates may have projections and/or indentations on the upper and/or lower side to determine the position of the metal frames. Projections or indentations provided on the upper side of the tin plate serve for locating in position the metal frames which together with the tin plate form the molds, whereas the projections and/or indentations located on the lower side of the tin plates retain the next tin plate on the frame of the mold lying thereunder in the correct position.

In the manufacture of molded bodies according to the method initially described a difficulty still exists in obtaining molded bodies with completely flat undersides. The gas generated at the time of heating during the foaming of the powder cannot easily escape from the base plates of the moulds, so that the pressure of the accumulating gases causes a certain arching on the underside of the molded body. The use of holes in the mould bases is not readily possible because the mass already contained in the moulds assumes a viscous condition at the temperatures used, in which condition the mass could drop through the holes provided in the mould base. The device according to the invention makes it possible to solve this problem. This solution consists in a further embodiment of the invention in that the tin plates are perforated and before the mineral powder is introduced are coated with a layer of sand. The layer of sand allows the gases generated during the foaming of the molded body to pass readily but, with a hole diameter of 1 to 2mm it is capable of retaining the viscous mass contained in the moulds at the foaming temperatures. Therefore, due to these measures molded bodies with absolutely flat undersides are obtained. The use of a layer of sand has the particular additional advantage that the grains of sand combine with the underside of the molded body to form a surface layer with particularly high strength. However, after applying the layer of sand to the bases the moulds must not move so that the sand is now shaken through the holes provided in the bases. In methods in which the moulds are transported through an annealing furnace by means of conveying devices, this measure would therefore not be possible.

Further details and embodiments of the device according to the invention are apparent from the subsequent description of the embodiment illustrated in the drawings. The features to be drawn from the description and drawings can be used in other embodiments individually or in any combination.

Figure 1:
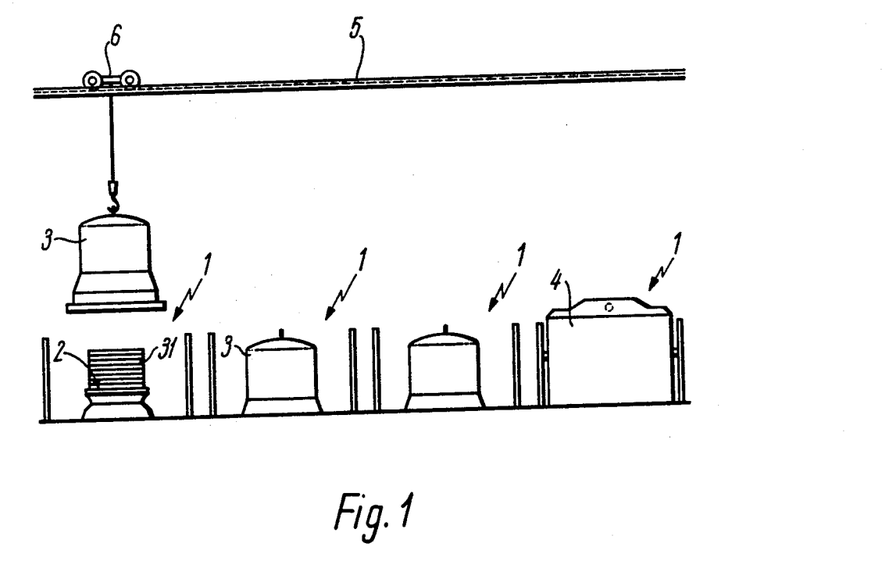
FIG. 1 is a diagrammatic illustration of a device according to the invention.

The device illustrated in FIG. 1 has four annealing positions 1, which comprise a half-plate 2 and a cooling cap 3 respectively. In addition a common annealing bell 4 is provided for all the annealing positions. Above the annealing positions 1 lifting tackle in the form of a guide rail 5 with a trolley 6 is provided which makes it possible to raise selectively one of the cooling caps 3 or the annealing bell 4 from the respective annealing position 1 and to convey it to another annealing position.

Figure 2:
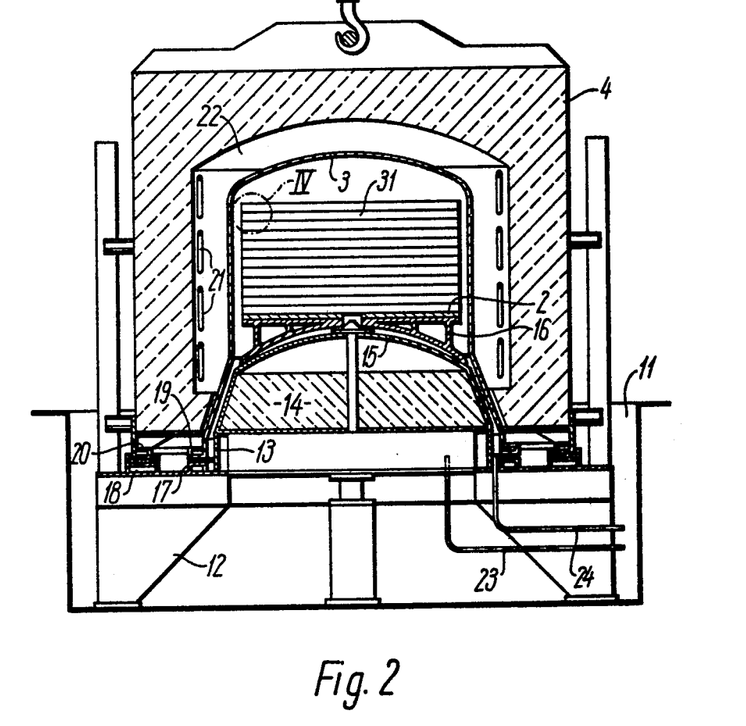
FIG. 2 is a vertical section through a bell-type furnace of the device 1.

The construction of an annealing position is illustrated in detail in FIG. 2 as can be seen a cavity 11 is located at each annealing position, on the base of which cavity a stand 12 is arranged, which in the vicinity of its centre supports an insulating base plate 14 on supports 13. Located above this base plate 14 is a metal dome 15, on which the hearth plate 2 is supported by means of support 16. The base plate 14 is surrounded concentrically by rails 17 and 18, which serve as seats for the colling cap 3 and the annealing bell 4. The rails are provided with seals and if necessary cooling water may pass through them.

The cooling cap 3 consists of sheet steel and has on its lower edge a sealing strip 19, with which it is seated on the innermost of the two rails surrounding the insulating base plate. Similarly the annealing bell 4 is also provided on its lower edge with a sealing strip 20, which is seated on the outer most of the rails surrounding the insulating base plate. If necessary water can also pass through the sealing strips located on the lower edge of the cooling cap 3 and the annealing bell 4. In contrast to the cooling cap 3 the annealing bell 4 consists of a fireproof material and in order to obtain the necessary heat insulation it is constructed with very thick walls. Heating elements 21 are located on its inner side, which make it possible to heat the inner space 22 of the bell-type furnace surrounded by the annealing bell 4 to temperatures of up to 1,000°C. If necessary, conduits 23 and 24 located in the region of the stand 12 facilitate the introduction of a safety gas or the formation of a vacuum in the inner space 22 of the bell-type furnace.

Figure 3:
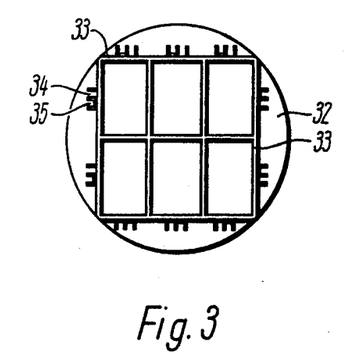
FIG. 3 is a plan view of the stack of moulds of the bell-type furnace according to FIG. 2.
Figure 4:
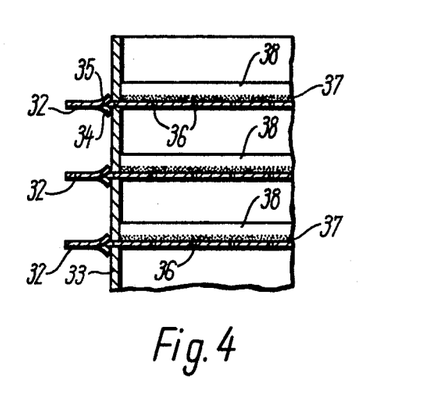
FIG. 4 shows the detail IV in the stack of moulds of the bell-type furnace according to FIG. 2

A stack of moulds 31 is located on the hearth plate 2, which stack, as can be seen from FIGS. 3 and 4, consists of a series of tin plates 32 and 33. The frames consisting of metal are secured in position on the tin plates 32 by tabs 34 and 35, which are located close to each other in pairs and which are pressed out of the plate one upwards and the other downwards. Only the lower tin plate supported on the hearth plate 2 has solely upwardly directed tabs 34. The tabs projecting upwards from the tin plates 32 serve as an abutment for the frame 32 which is placed thereon, which abut against the ends of the tabs with their outer sides, whilst the tabs pressed out of the tin plate in a downward direction secure the next tin plate on the frame located thereunder. In the region of the surface defined by the frame 33 the tin plates 32 are provided with small holes 36, which have a diameter of approximately 1 to 2mm.

During the operation the stack of moulds 31 is erected on the hearth plate 2 at a free annealing position, in which stack the tin plates 32 are placed one after the other and then the frame 33 are placed thereon. After the respective frames 33 have been placed on one tin plate, the tin plate is covered with a thin layer of sand 37. A layer 38 of the mineral powder to be foamed is then placed on this layer of sand. This layer has a height of approximately 20 to 25 percent of the height of the frames 33. When the stack of moulds 31 has been completed in this way, so that all the moulds are placed in position and are provided with the layer of sand and the layer of mineral powder, the cooling cap 3 suspended above the hearth plate by means of the trolley 6 is lowered and placed with its sealing strip 19 on the associated rail 17 on the stand 12 of the annealing position. Then by means of the trolley 6 the annealing bell 4 which up till then was located at another annealing position, is raised from this annealing position, moved to the annealing position just provided with the cooling cap and lowered over the cooling cap, so that the annealing position now has the structure illustrated in FIG. 2. Then in a manner now shown in detail the heating elements 21 located in the annealing bell 4 are connected to a source of power and the cavity 22 of the annealing bell is brought to a temperature of between 700° and 900°C. This temperature is maintained for approximately 10 to 30 minutes. Meanwhile the mineral powder contained in the stack of moulds 31 assumes a viscous state and is foamed into the desired molded body. The layer of sand 37 provided on the tin plates 32 prevents the material contained in the moulds from passing in its viscous state through the holes 36 in the tin plate 32. On the other hand the layer of sand in conjunction with the holes 36 allows the gases produced during foaming to escape so that they do not accumulate on the upper side of the tin plate 32. Consequently the molded bodies produced by means of the device according to the invention has an absolutely flat underside. At the same time the layer of sand combines with the molded body and forms a particularly hard and resistant surface. One requirement for the use of perforated tin plates 32 in conjunction with a layer of sand 37 is that after the application of the layer of sand the tin plates are not moved. Otherwise the layer of sand and also the maineral powder would fall through the holes due to the shaking of the mould. However the use of unperformated tin plates leads to an uneven underside of the molded bodies due to the pressure of the accumulating gases.

When the period of time provided for the heat treatment is over, the annealing bell 4 is raised from the respective annealing positions by means of the trolley 6 and moved to another annealing position, at which a stack of moulds has been erected in the above described manner. The annealing bell 4 is then lowered onto the previously lowered cooling cap, the aforedescribed process being repeated at this new annealing position. It can be seen that in this way the annealing bell can be in an interrupted operation. In this case the annealing bell never needs to cool down, so that the device according to the invention has a relatively low energy consumption.

At the annealing position, from which the annealing bell 4 has just been removed, the stack of moulds together with the molded bodies located therein and the cooling cap 3 is at the temperature produced in the cavity 22 of the annealing bell. The cooling cap 3 outwardly sealing off the vicinity of the stack of moulds 31 prevents the stack of moulds with the molded bodies from coming into direct contact with the relatively cold ambient air and therefore from cooling when too quickly. A too rapid cooling would lead to stresses in the molded bodies, which could result in cracking of the molded bodies. Therefore it is necessary to cool the molded bodies relatively slowly over a period of approximately 2 hours. By selecting size and wall thickness as well as the material from which the cooling cap is made, the heat loss to the ambient air can be controlled such that the cooling of the molded bodies lasts for 2 hours.

Since in the arrangement described the cooling cap 3 is located inside the annealing bell 4 during the heat treatment and is therefore heated to the same temperature as the molded bodies, it protects the molded bodies against a rapid cooling even at very high temperatures. However the cooling can take place without danger for the molded bodies at high temperatures very much quicker than at low temperatures. Therefore it can be appropriate to ensure a rapid cooling of the molded bodies at high temperatures and to slow down this cooling at lower temperatures. This possibility is provided by the embodiment of a cooling cap 41 illustrated in FIG. 5, which cap can be used in place of the cooling cap 3 in the presently described device. The cooling cap 41 according to FIG. 5 consists not solely of sheet steel but has, on its inner side, a heat insulation 42 in which the heating elements 43 are embedded. This cooling cap 41 does not remain at the annealing position during the heat treatment, but is removed before the annealing bell 4 is put in position and is put in position in place of the annealing bell only after the heat treatment. Consequently the cooling cap 41 does not have the same high temperatures as the molded bodies just produced, but a substantially lower temperature, so that a relatively rapid cooling of the molded bodies with simultaneous heating of the cooling cap takes place, until thermal equilibrium exists between the cooling cap and the stack of molds. From this temperature on, a common cooling down takes place, which however, due to the heat insulation 42 takes place morely slowly than in the cooling cap 3 consisting of steel.

Figure 5:
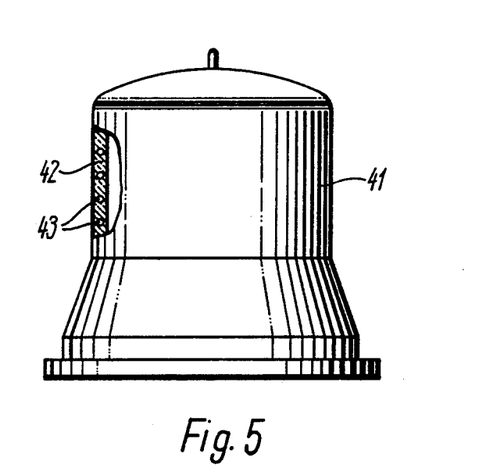
FIG. 5 shows partially in side view and partially in section a further embodiment of a cooling cap suitable for the device according to the invention.

The temperature, up to which the more rapid cooling takes place and from which the cooling is then slowed down can be easily determined in that the cooling cap 41 has a predetermined initial temperature, which lies below the treatment temperature of the molded bodies. The heating elements embedded in the heat insulation 42 provide the possibility of heating the cooling cap to any desired initial temperature. The speed of the drop to the equilibrium temperature between the cooling cap and the stack of plates is largely determined by the thermal capacity of the cooling cap, whereas the cooling speed after reaching the point of equilibrium is influenced to a great extent by the heat insulation 42. Both values can likewsie be varied in order to obtain the desired cooling characteristics.

From the aforesaid it is clear that due to the invention a method and device are provided with starting from inexpensive initial materials allows the production of porous molded bodies of high quality very rationally. However it is understood that the invention is limited neither to the examples of the method described nor to the embodiments of the device illustrated, but that modifications thereof are possible without diverging from the framework of the invention.

What is claimed is:

1. Method for the manufacture of porous molded bodies, comprising the steps of heating a mixture containing crushed crystalline silicate material and alkali silicates in the weight ratio of 2 to 6:1, and 15percent water by weight of dry substance in a closed vessel at 140° to 500°C avoiding the vapor phase to produce a transformation product, drying and crushing and transformation product, charging the transformation product into a mold and heating the transformation product at 700° to 900°C.

2. Method according to claim 1, wherein the water is introduced at least partially as water of hydration of the alkali silicates.

3. Method according to claim 1, wherein powdered mineral rich in a substance selected from the group consisting of aegirine, natural zeolites, and synthetic zeolites is used as the crystalline silicate material.

4. Method according to claim 1, wherein a compound selected from the group consisting of alkali borates, boric acid and alkali phosphates is added to the starting material.

5. Method according to claim 1, wherein one of the group consisting of vanadium and titanium compounds is added to the starting material in quantities of up to 10 percent by weight.

6. Method according to claim 1, wherein a starting material is used, in which the crystalline silicate material and alkali silicates are present in the weight ratio of 3.3:1 and the transformation takes place when the vessel contains 540 to 580g per litre volume of the vessel and at a temperature of 200°C.

7. Method according to claim 1, wherein further comprising adding a silicate material to the transformation product in the ratio of 0.02 to 6:1.

8. Method according to claim 1 wherein finely ground silicate products are mixed with the dried transformation product which silicate products are obtained by decomposing silicate material with alkali silicates in aqueous solutions and by evaporating the solutions to dryness.

9. The method according to claim 1, wherein said mixture is heated in a constant volume system under such conditions that the formation of a vapor phase during heating is avoided.

10. The method according to claim 1, wherein up to 20 percent by weight basalt dust is added to said transformation product prior to charging thereof into said mold.

11. A method for manufacturing porous bodies comprising heating a mixture containing crushed crystalline silicate materials and alkali silicates in a weight ratio of 2 to 6:1, and 15 percent water by weight of dry crystalline silicate material and alkali silicates in a closed constant volume vessel at 140° to 500°C to produce a transformation product, the amount of said mixture subjected to heating in said vessel being sufficient so that substantially no vapor phase is formed during heating, and drying, crushing and heating the transformation product so that a porous article is formed.

12. The method according to claim 11, wherein the amount of said mixture in said vessel subjected to heating is sufficient so that substantially all water present in said mixture before heating is bound in said transformation product after heating so that substantially no water vapor is released when said transformation product is removed from said vessel.

13. The method according to claim 12, wherein about 540 to 580 grams of said mixture are subjected to heating in said vessel for each litre of volume of said vessel.

14. The method according to claim 11, wherein said transformation product is charged into a mold and heated in said mold to a temperature of about 700° to 900°C to produce a molded porous article.

15. The method according to claim 11, wherein said transformation product is dried to a water content of about 2.5 percent.

16. The method according to claim 15, wherein drying is accomplished in an open vessel.

17. The method according to claim 15, wherein said transformation product is crushed to a particle size of about 0.1 to 1 mm.

18. The method according to claim 11, wherein said transformation product is crushed to a particle size of about 0.1 to 1 mm.

19. The method according to claim 11, wherein said silicate material is selected from the group consisting of aegirine, natural zeolites and synthetic zeolites.

20. The method according to claim 11, wherein said mixture further includes up to 20 percent by weight basalt.

21. The method according to claim 11, wherein said crystalline silicate material is aegirine, natural zeolites, synthetic zeolites, quartzite, light ashes, blast furnace slag or ordinary building sand.

22. The method according to claim 11, wherein a portion of the water in said mixture is in chemically combined form.

23. The method according to claim 22, wherein a portion of the water in said mixture is in hydrate form.

* * * * *